(12) United States Patent
Liu et al.

(10) Patent No.: US 10,944,141 B2
(45) Date of Patent: Mar. 9, 2021

(54) COMPOSITE END PLATE AND BATTERY MODULE

(71) Applicant: Contemporary Amperex Technology Co., Limited, Ningde (CN)

(72) Inventors: Wenwen Liu, Ningde (CN); Gen Cao, Ningde (CN); Jihua Yao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 224 days.

(21) Appl. No.: 16/225,958

(22) Filed: Dec. 19, 2018

(65) Prior Publication Data

US 2019/0207194 A1    Jul. 4, 2019

(30) Foreign Application Priority Data

Dec. 29, 2017  (CN) .......................... 201711488347.5

(51) Int. Cl.
| | |
|---|---|
| H01M 2/22 | (2006.01) |
| H01M 2/04 | (2006.01) |
| H01M 2/10 | (2006.01) |
| H01M 50/528 | (2021.01) |
| H01M 10/04 | (2006.01) |
| H01M 50/20 | (2021.01) |

(Continued)

(52) U.S. Cl.
CPC ..... *H01M 50/528* (2021.01); *H01M 10/0481* (2013.01); *H01M 50/148* (2021.01); *H01M 50/20* (2021.01); *H01M 50/209* (2021.01)

(58) Field of Classification Search
None
See application file for complete search history.

(56) References Cited

U.S. PATENT DOCUMENTS

2018/0212212 A1* 7/2018 Cao ..................... H01M 2/1005

FOREIGN PATENT DOCUMENTS

| CN | 205900653 U | 1/2017 |
|---|---|---|
| CN | 106654103 A | 5/2017 |

(Continued)

OTHER PUBLICATIONS

The extended European search report dated Apr. 25, 2019 for European application No. 18213199.5, 12 pages.

*Primary Examiner* — Kaity V Chandler
(74) *Attorney, Agent, or Firm* — Law Offices of Liaoteng Wang (57) ABSTRACT

The disclosure relates to a composite end plate and a battery module. The composite end plate comprises an end plate body and a rigid connecting plate. The end plate body comprises a first surface and a second surface disposed opposite to each other in its thickness direction, a first connecting segment, an intermediate transitional segment and a second connecting segment disposed successively in its width direction. The rigid connecting plate and the end plate body are made of different materials. The rigid connecting plate is disposed at the intermediate transitional segment, and comprises a transferring segment and a connecting arm embedded into the intermediate transitional segment such that the rigid connecting plate and the end plate body are fixedly connected. The transferring segment is located at the second surface. A surface of the transferring segment away from the intermediate transitional segment can be fixedly connected to an external structural component.

19 Claims, 6 Drawing Sheets

(51) Int. Cl.
*H01M 50/148* (2021.01)
*H01M 50/209* (2021.01)

(56) References Cited

FOREIGN PATENT DOCUMENTS

| | | |
|---|---|---|
| CN | 206250254 U | 6/2017 |
| EP | 2819210 A1 | 12/2014 |

* cited by examiner

COMPOSITE END PLATE AND BATTERY MODULE

CROSS-REFERENCE TO RELATED APPLICATION

This application is based on and claims priority to Chinese Patent Application No. 201711488347.5 filed on Dec. 29, 2017, which is incorporated herein by reference in its entirety.

FIELD

The present disclosure relates to the technical field of battery, and in particular to a composite end plate and a battery module.

BACKGROUND

With continuous developments of technologies, power batteries are applied to more and more areas involving production and life. The power battery, also known as secondary battery, is a rechargeable battery. The power batteries are widely used. The power batteries with a low capacity may be applied to small electric vehicles, and the power batteries with a high capacity may be applied to large electric vehicles, such as hybrid electric vehicles or electric cars. When the power batteries were used in groups, a busbar is needed to connect each of the power batteries in series or in parallel. Usually, the busbar is welded to a positive electrode and a negative electrode of the power battery. Each power battery comprises a plurality of battery modules. Each battery module comprises a plurality of batteries, end plates and side plates for fixing the batteries. The end plates and the side plates are disposed to surround all the batteries. Existing end plate is structured as a single component. The end plate and the side plate are fixedly mounted through welding. With an increasing capacity of battery module, the battery may expand in some cases and thus exert expansion forces on the end plates and the side plates. This will render the end plates and the side plates liable to deformation and displacement, which will cause failure of welding seams between the side plates and the end plates. Therefore, there is a problem of low structural strength in traditional battery modules.

SUMMARY

According to embodiments of the disclosure, there is provided a composite end plate and a battery module. The composite end plate can be firmly connected to side plates, thus it is possible to effectively resist expansion and deformation forces resulted from battery expansion, prevent an overall dimension of the battery module from being enlarged, and facilitate safe and reliable application of the battery module.

In one aspect, the disclosure provides a composite end plate for a battery module comprising: an end plate body and a rigid connecting plate. The end plate body comprises a first surface and a second surface disposed opposite to each other in its thickness direction, and comprises a first connecting segment, an intermediate transitional segment and a second connecting segment disposed successively in its width direction. The rigid connecting plate and the end plate body are made of different materials, the rigid connecting plate is disposed at the intermediate transitional segment of the end plate body, the rigid connecting plate comprises a transferring segment and a connecting arm extending from the transferring segment toward the end plate body, the connecting arm is embedded into the intermediate transitional segment such that the rigid connecting plate and the end plate body are fixedly connected, the transferring segment is located at the second surface and extends in a height direction of the end plate body, and a surface of the transferring segment away from the intermediate transitional segment is exposed to external environment and can be fixedly connected to an external structural component.

According to an aspect of embodiments of the disclosure, the end plate body and the rigid connecting plate are made of metal materials; or the end plate body is made of non-metal material, and the rigid connecting plate is made of metal material.

According to an aspect of embodiments of the disclosure, the connecting arm comprises a first extending segment and a second extending segment intersecting with each other, wherein the connecting arm is connected to the transferring segment through the first extending segment, and the first extending segment intersects with the transferring segment.

According to an aspect of embodiments of the disclosure, the second extending segment comprises a recess and/or a protrusion at a surface for contacting with the end plate body.

According to an aspect of embodiments of the disclosure, the first extending segment is perpendicular to the transferring segment, and the first extending segment is perpendicular to the second extending segment.

According to an aspect of embodiments of the disclosure, the second extending segment and the transferring segment are disposed parallel to each other.

According to an aspect of embodiments of the disclosure, there is one connecting arm which is disposed at a center of the transferring segment.

According to an aspect of embodiments of the disclosure, there are two connecting arms, which are disposed at two respective sides of the transferring segment opposite to each other in the width direction.

According to an aspect of embodiments of the disclosure, the end plate body comprises an inserting groove extending in the height direction, and the rigid connecting plate can be inserted into the inserting groove through the connecting arm and connected to the end plate body.

According to an aspect of embodiments of the disclosure, a surface of the transferring segment away from the end plate body is flush with the second surface.

According to an aspect of embodiments of the disclosure, the end plate body comprises a plurality of through holes, which are disposed in the intermediate transitional segment and extend in the height direction.

According to embodiments of the disclosure, the composite end plate comprises the end plate body and the rigid connecting plate made of different materials. The side plate can be indirectly connected to the composite end plate through the rigid connecting plate, thus it is beneficial to select different materials of the side plate according to actual requirements in application. The material of the end plate body can also be flexibly selected. Thus, it is possible to achieve an overall lightweight design of the composite end plate and thereby an overall lightweight design of the battery module. When the composite end plate is applied in the battery module, the rigid connecting plate can be fixedly connected to the side plate. The rigid connecting plate and the side plate can be made of identical material, and can be connected to each other through a welding process. As such, welding seam formed between the rigid connecting plate and the side plate has high seam strength and good resistance to tension such that the composite end plate can bear larger expansion forces resulted from the battery expansion and it is possible to improve overall structural reliability of the battery module.

In another aspect, the disclosure provides a battery module comprising: a plurality of batteries arranged side by side; and a fixing frame enclosing all the batteries at a periphery of the batteries, wherein the fixing frame comprises two composite end plates as described above and two side plates, the composite end plates and the side plates are successively and alternatively disposed to surround the batteries, the side plate and the rigid connecting plate are made of an identical material and the side plate is fixedly connected to the transferring segment.

BRIEF DESCRIPTION OF THE DRAWINGS

Features, advantages, and technical effects of exemplary embodiments of the present disclosure will be described below with reference to accompanying drawings.

The views are not necessarily plotted in actual proportion in the drawings.

Reference signs in the drawings:
1 composite end plate;
11 end plate body;
11a first surface;
11b second surface;
110 central axis;
111 first connecting segment;
112 intermediate transitional segment;
113 second connecting segment;
114 inserting groove;
115 receiving groove;
116 through hole;
117 mounting hole;
12 rigid connecting plate;
121 transferring segment;
122 connecting arm;
122a first extending segment;
122b second extending segment;
123 recess;
124 protrusion;
2 side plate;
X width direction;
Y thickness direction;
Z height direction.

DETAILED DESCRIPTION

Below, embodiments of the present disclosure will be further described in detail with reference to the drawings and embodiments. The detailed description according to the embodiments and the accompanying drawings are intended to exemplary illustrate the principles of the present disclosure and are not intended to limit the scope of the present disclosure. That is, the present disclosure is not limited to the described embodiments.

In the description of the present disclosure, it should be noted that, unless otherwise stated, the meaning of "a plurality" is two or more; the orientation or positional relationship indicated by the terms "upper", "lower", "left", "right" and the like is merely for the purpose of describing the present disclosure and simplifying the description, and is not intended to indicate or imply that the device or component referred to has a particular orientation, is constructed and operated in a particular orientation, and therefore cannot be understood to be a limitation of the present disclosure. Moreover, the terms "first", "second", and the like are configured for descriptive purposes only and are not to be construed as indicating or implying relative importance.

In the description of the present disclosure, it should be noted that, unless otherwise stated, the terms "installation", "connected to", and "connected with" are to be understood broadly, and may be, for example, a fixed connection, a disassemble connection, or an integral connection; they can be connected directly or indirectly through an intermediate medium. The specific meaning of the above terms in the present disclosure can be understood by the person skilled in the art according to actual circumstance.

For better understanding of the disclosure, a composite end plate 1 according to embodiments of the disclosure will be described below in detail with reference to FIGS. 1 to 6.

Figure 1:
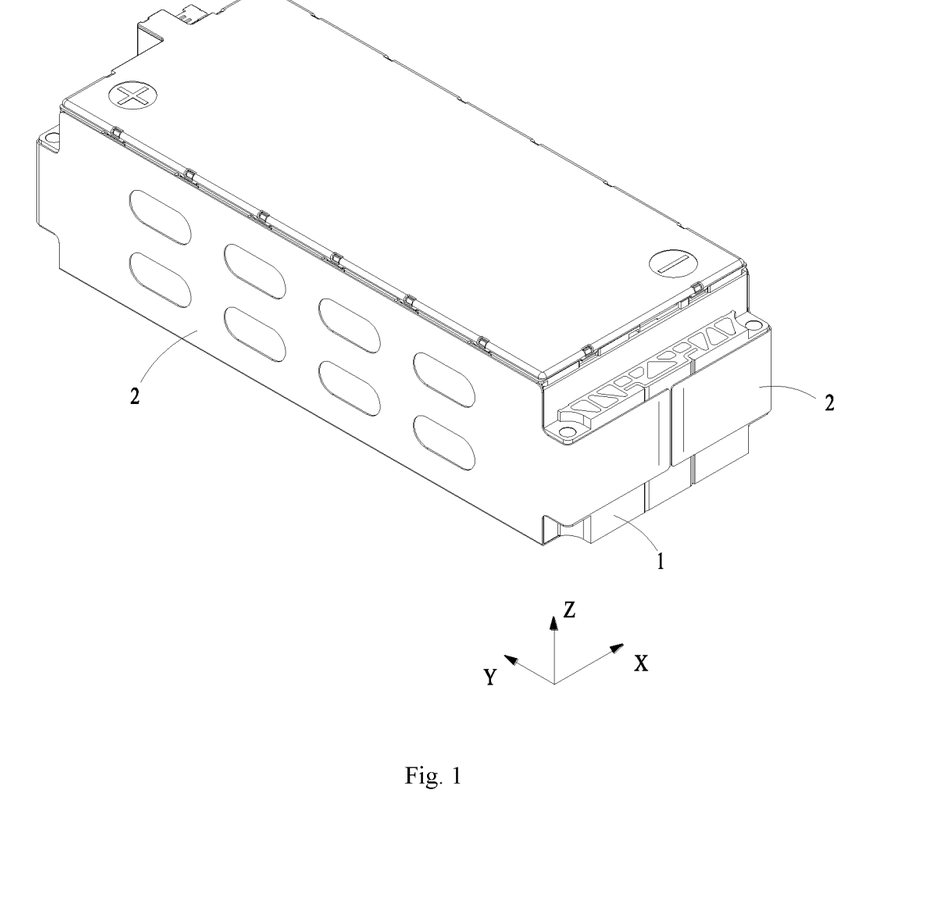
FIG. 1 is a structural schematic diagram of a battery module according to an embodiment of the disclosure.
Figure 2:
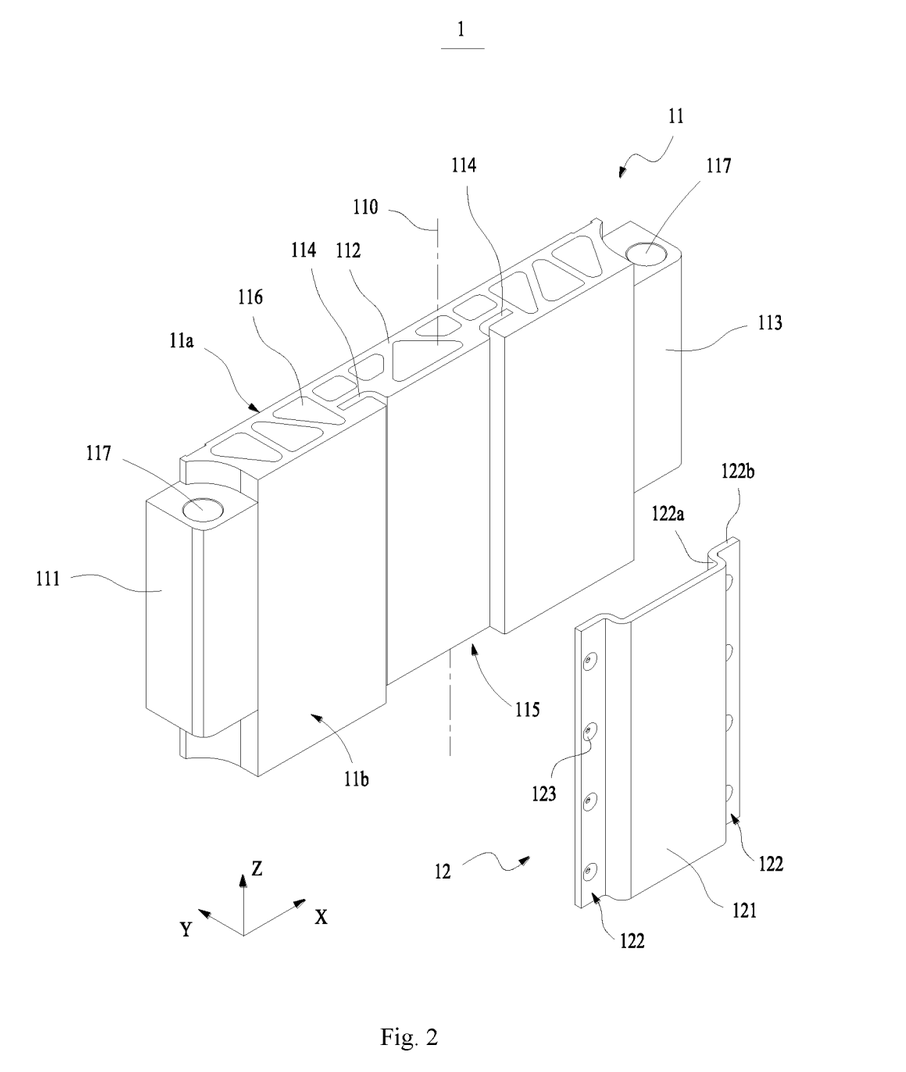
FIG. 2 is an exploded structural view of a composite end plate according to an embodiment of the disclosure.
Figure 3:
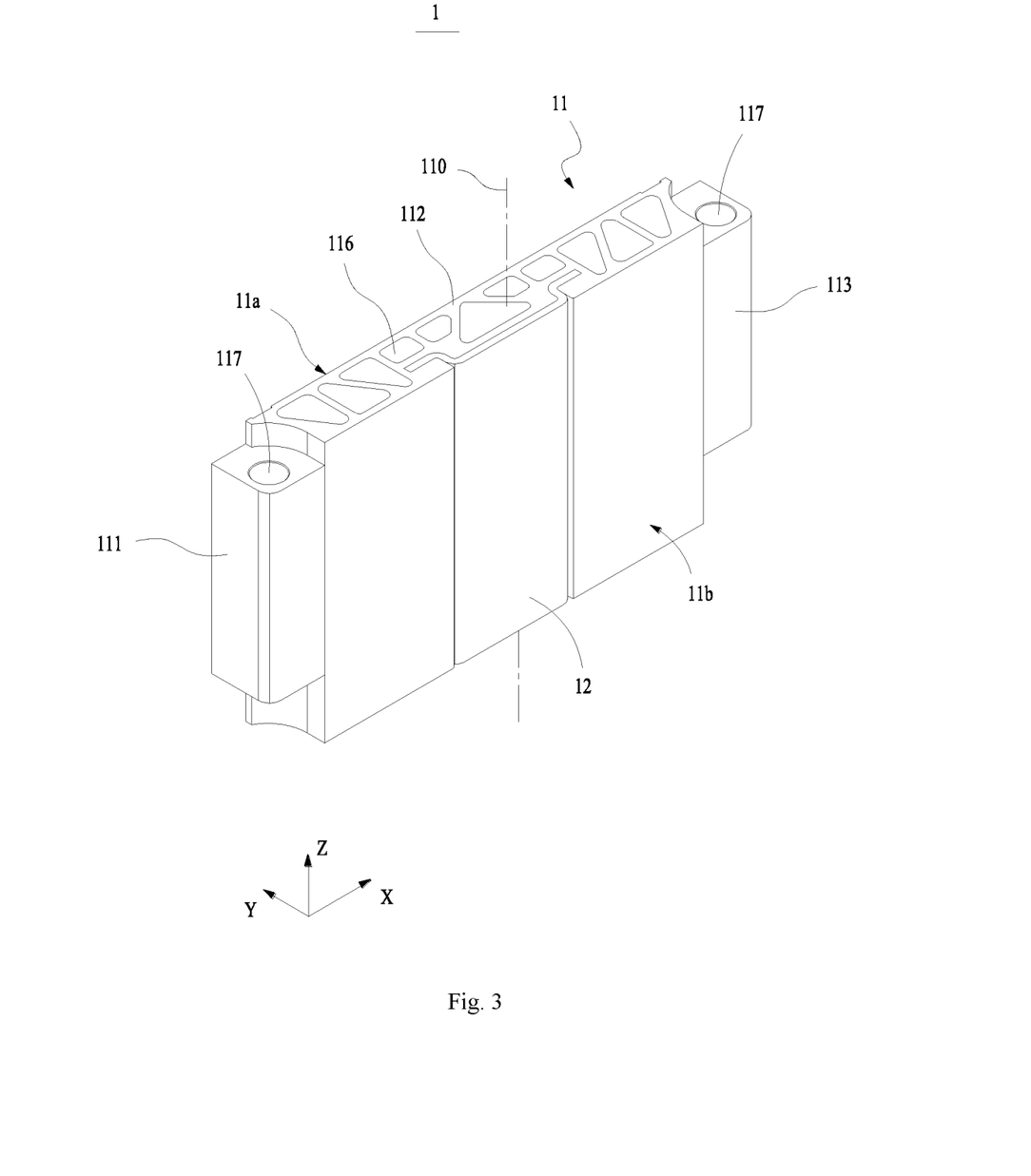
FIG. 3 is a structural schematic diagram of a composite end plate according to an embodiment of the disclosure.
Figure 4:
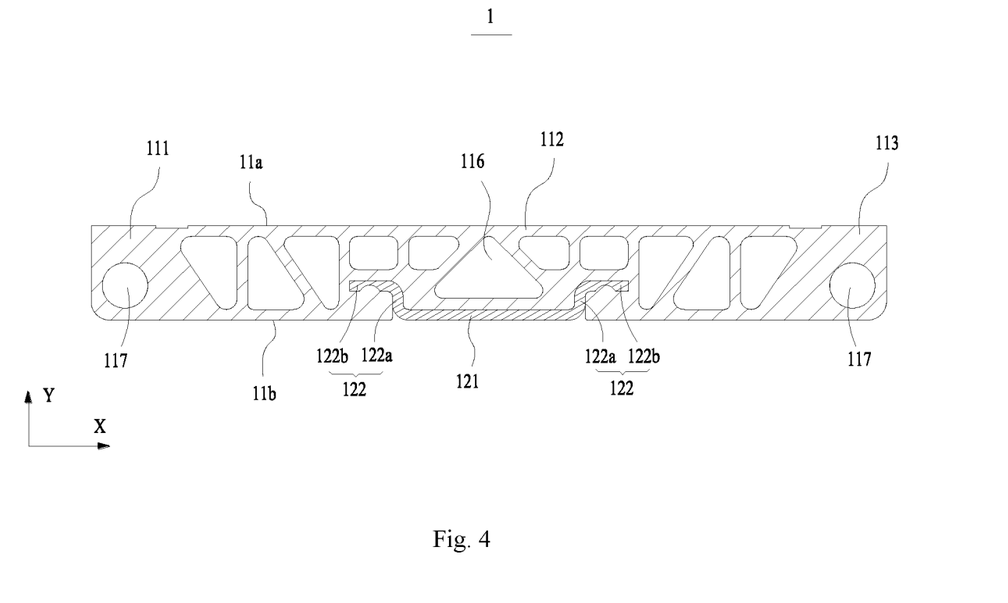
FIG. 4 is a sectional structural view of a composite end plate according to an embodiment of the disclosure.
Figure 5:
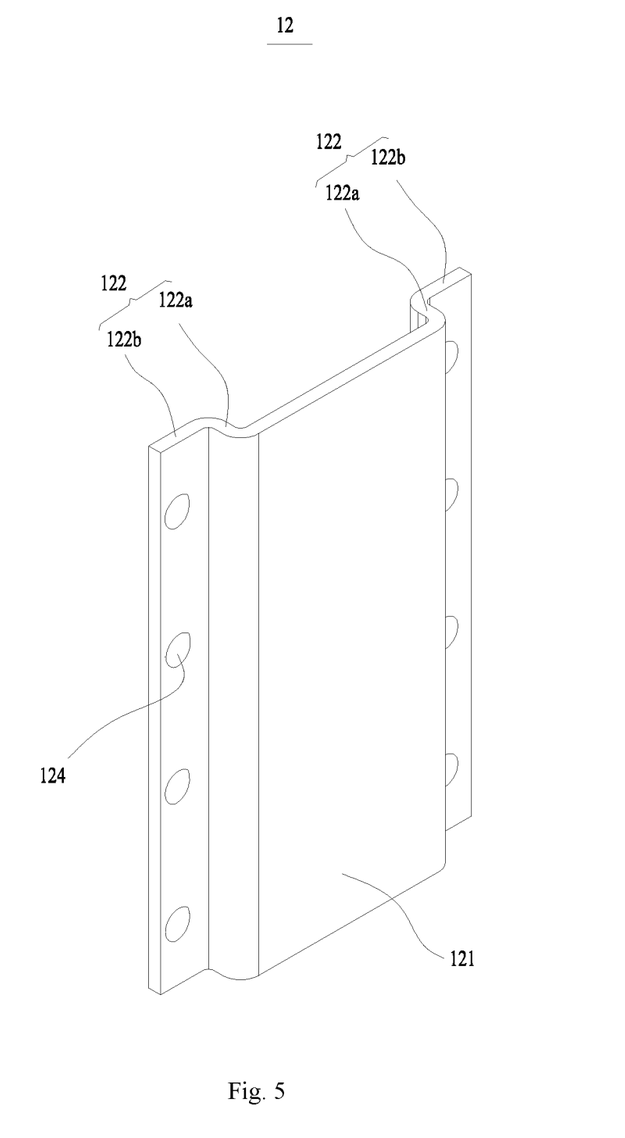
FIG. 5 is an overall structural diagram of a rigid connecting plate according to an embodiment of the disclosure.
Figure 6:
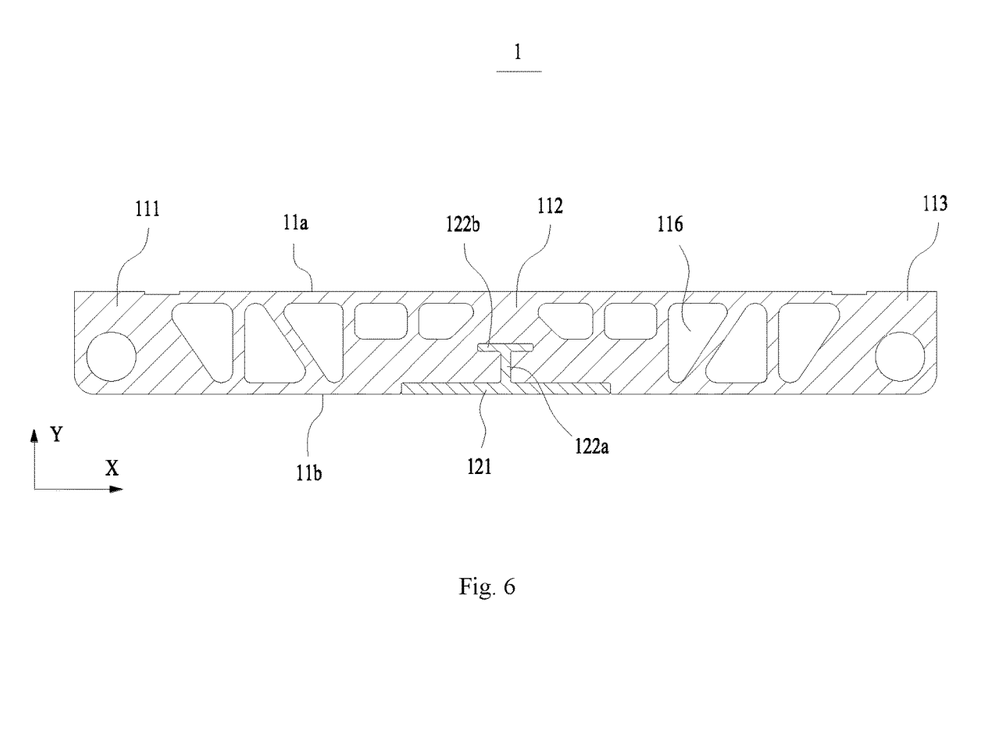
FIG. 6 is a sectional structural view of a composite end plate according to another embodiment of the disclosure.

FIG. 1 schematically shows an overall structure of a battery module according to an embodiment. FIG. 2 schematically shows an exploded structure of a composite end plate 1 according to an embodiment. FIG. 3 schematically shows an overall structure of a composite end plate 1 according to an embodiment. FIG. 4 schematically shows a sectional structure of a composite end plate 1 according to an embodiment. FIG. 5 schematically shows an overall structure of a rigid connecting plate according to an embodiment. FIG. 6 schematically shows a sectional structure of a composite end plate 1 according to another embodiment.

As shown in FIG. 1, the composite end plate 1 according to embodiments of the disclosure is applied in a battery module. The battery module according to the embodiment comprises a plurality of batteries (not shown) arranged along a direction, two composite end plates 1 according to embodiments of the disclosure and two side plates 2. The batteries form an assembly. The two composite end plates 1 are disposed at two opposite sides of the assembly in the battery arrangement direction. The two side plates 2 are spaced apart in a direction perpendicular to the battery arrangement direction, and are connected to the two composite end plates 1, respectively. The two composite end plates 1 and the two side plates 2 together form a fixing frame for fixing the batteries. The side plate 2 can comprise multiple holes to reduce its weight and facilitate heat dissipation of the batteries.

As shown in FIG. 2 and FIG. 3, the composite end plate 1 according to embodiments of the disclosure comprises an end plate body 11 and a rigid connecting plate 12.

The end plate body 11 according to the embodiment has a predetermined width, thickness and height, which can be flexibly selected according to practical requirements. The end plate body 11 has a first surface 11a and a second surface 11b opposite to each other in its thickness direction Y. When the composite end plate 1 is applied in the battery module, the first surface 11a of the end plate body 11 faces the battery. The first surface 11a is generally a flat surface and substantially contacts with a large flat surface of the battery with a rectangular shape to avoid squeezing a case of the battery. The second surface 11b of the end plate body 11 faces away from the batteries but is oriented to external environment.

The end plate body 11 according to the embodiment comprises a first connecting segment 111, an intermediate transitional segment 112 and a second connecting segment 113 disposed successively in its width direction X. When the batteries, the composite end plates 1 and the side plates 2 are assembled into a battery module, the battery module can be connected to external structure components through the first connecting segment 111 and the second connecting segment 113 of the end plate body 11, such as a battery box for accommodating the battery module. In an embodiment, both the first connecting segment 111 and the second connecting segment 113 of the end plate body 11 comprises screw mounting holes 117 extending in a height direction Z. It is convenient to use screws to fixedly connect the end plate body 11 to the external structural components.

The end plate body 11 according to the embodiment comprises a plurality of through holes 116, which are disposed in the intermediate transitional segment 112 and extend in the height direction Z. The end plate body 11 comprises a top portion and a bottom portion opposite to each other in the height direction Z. Each through hole 116 passes through the top portion and the bottom portion of the end plate body 11. On one side, the end plate body 11 with the through holes 116 has a light weight, thus it facilitates improving an overall lightweight design of the battery module. On another side, the end plate body 11 with the through holes 116 has good rigidity to improve its resistance to deformation, and can bear more stress without deformation. On yet another side, the through holes 116 of the end plate body 11 can serve as heat dissipation channels to provide additional heat dissipation for a battery adjacent to the end plate body 11 and reduce the battery's temperature. Optionally, the through hole 116 has a circular, rectangular or triangular shape in its cross-section.

The rigid connecting plate 12 according to the embodiment comprises a transferring segment 121 and a connecting arm 122 extending from the transferring segment 121 toward the end plate body 11. The connecting arm 122 is embedded in the intermediate transitional segment 112 of the end plate body 11 such that the rigid connecting plate 12 is fixedly connected to the end plate body 11. The rigid connecting plate 12 is accurately located in the end plate body 11 through the connecting arm 122, and it is ensured that the rigid connecting plate 12 will not easily get out from the end plate body 11. The transferring segment 121 is located at the same side with the second surface 11b of the end plate body 11 and extends in the width direction X of the end plate body 11. A surface of the transferring segment 121 away from the intermediate transitional segment 112 is exposed to external environment and can be fixedly connected to the side plate 2. The rigid connecting plate 12 and the end plate body 11 are made of different materials. Optionally, both the end plate body 11 and the rigid connecting plate 12 are made of metal materials. Alternatively, the end plate body 11 is made of non-metal material and the rigid connecting plate 12 is made of metal material. The rigid connecting plate 12 and the side plate 2 are made of identical material. Each end of the two side plates 2 can be bent to the side of a second surface 11b of an end plate body 11 and connected to a transferring segment 121.

In an embodiment, the side plate 2 of the battery module can be connected to the transferring segment 121 of the rigid connecting plate 12. When a battery is expanded and deformed, the battery will exert forces on the composite end plates 1 such that the two composite end plates 1 tend to go away from each other. Then, a tensile force is generated between the side plate 2 and the transferring segment 121. Since the connecting arm 122 of the rigid connecting plate 12 is embedded in the end plate body 11, the rigid connecting plate 12 can bear the tensile force. The connecting arm 122 can be firmly connected to the end plate body 11, and prevent the rigid connecting plate 12 from being moved in the width direction X of the end plate body 11 due to the tensile force.

Optionally, both the side plate 2 and the rigid connecting plate 12 are made of steel, thus they can be fixedly connected through welding. Such connection is simple and easy to operate. When the side plate 2 and the rigid connecting plate 12, both of which are made of steel, are welded together, their joint has high connection strength and can bear larger stress. It is possible to avoid a case in which the expansion forces resulted from the expansion of the batteries easily break the welding joint between the side plate 2 and the rigid connecting plate 12. As such, the side plate 2 and the rigid connecting plate 12 have a welding seam with high strength, which improves resistance to tensile stress. Thereby, the composite end plate 1 can bear larger expansion forces from the batteries. It is possible to improve overall structural reliability of the battery module and effectively prevent the dimension of the battery module from being changed due to the expansion of the batteries. It should be appreciated that both the side plate 2 and the rigid connecting plate 12 can be made of other identical material which can meet the requirements for connection strength.

When the composite end plate 1 according to the embodiment is applied in the battery module, the end plate body 11 of the composite end plate 1 according to the embodiment is disposed adjacent to the battery, and the transferring segment 121 of the rigid connecting plate 12 can be fixedly connected to the side plate 2. In an embodiment, the two side plates 2 are fixedly connected to the surface of the transferring segment 121 away from the end plate body 11, respectively. The two side plates 2 can tighten the rigid connecting plates 12 simultaneously and transfer the tightening force to the batteries through the end plate bodies 11 to resist expansion and deformation forces of the batteries.

According to embodiments of the disclosure, since the composite end plate 1 is connected to the side plate 2 via the rigid connecting plate 12, the material of the end plate body 11 can be flexibly selected. In an embodiment, both the rigid connecting plate 12 and the side plate 2 are made of steel. Preferably, both the rigid connecting plate 12 and the side plate 2 are made of stainless steel, which provides high connection strength and good corrosion resistance. When the side plate 2 and the rigid connecting plate 12, both of which are made of an identical metal material, have a connection stiffness meeting the requirements, the end plate body 11 can have a density lower than that of the rigid connecting plate 12. Optionally, the end plate body 11 can be made of engineering plastics, glass fiber reinforced plastics or carbon fibers. Thus, it is possible to reduce an overall weight of the composite end plate 1 and improve the overall lightweight design of the battery module. Optionally, the end plate body 11 can be made of aluminum or aluminum alloy, which can be processed and machined in an extrusion molding process and a machining process.

In an embodiment, the rigid connecting plate 12 and the end plate body 11 can be connected in a non-detachable manner. Optionally, the end plate body 11 is made of engineering plastics, and the connecting arms 122 of the rigid connecting plate 12 can be directly embedded in the end plate body 11 through injection molding. Optionally, the end plate body 11 can be made of aluminum, and the connecting arms 122 of the rigid connecting plate 12 can be directly embedded in the end plate body 11 through mold casting.

Optionally, the end plate body 11 is made of aluminum and the rigid connecting plate 12 is made of steel. The rigid connecting plate 12 and the end plate body 11 can generate an aluminum-steel composite through extrusion molding to form the composite end plate 1. In the extrusion molding process, the cleaned rigid connecting plate 12 and end plate body 11 are extruded in an extrusion die with specified processing parameters to form a firm composite structure. In the combining of different metal materials in this way, it performs the molding process through the action of heat and pressure during the extrusion, such that the composite end plate 1 formed of the rigid connecting plate 12 and the end plate body 11 provides firm connection and good resistance to deformation.

In an example, the rigid connecting plate 12 can be detachably connected to the end plate body 11 such that the rigid connecting plate 12 and the end plate body 11 can be separately manufactured and then assembled together, and it is convenient to change or maintain the rigid connecting plate 12. Optionally, the inserting groove is disposed in the end plate body 11 and extends in the height direction Z. The rigid connecting plate 12 is inserted into the inserting groove through the connecting arms 122 and thus connected to the end plate body 11.

As shown in FIG. 4 and FIG. 5, the connecting arm 122 according to the embodiment comprises a first extending segment 122a and a second extending segment 122b intersecting with each other. The connecting arm 122 is connected to the transferring segment 121 through the first extending segment 122a, and the first extending segment 122a intersects with the transferring segment 121. The first extending segment 122a of the connecting arm 122 extends in the thickness direction Y of the end plate body 11, and mainly bears forces in the width direction X of the end plate body 11, such as tensile forces transferred from the side plate 2 to the rigid connecting plate 12. The second extending segment 122b of the connecting arm 122 extends in the width direction X of the end plate body 11, and mainly bears forces in the thickness direction Y of the end plate body 11. In this case, the rigid connecting plate 12 can bear forces in both the width direction X and the thickness direction Y of the end plate body 11, and thus has a good bearing capacity and a good positional stability. Optionally, the first extending segment 122a is perpendicular to the transferring segment 121, and the first extending segment 122a is perpendicular to the second extending segment 122b.

According to the embodiment, the second extending segment 122b comprises a recess 123 at a surface for contacting with the end plate body 11. When the rigid connecting plate 12 and the end plate body 11 are connected together through injection molding or mold casting to form the composite end plate 1, a portion of the end plate body 11, which corresponds to the recess 123 in the second extending segment 122b, can protrude into the recess 123 in the second extending segment 122b, such that the end plate body 11 and the second extending segment 122b can mesh with each other. It improves the connection strength between the end plate body 11 and the rigid connecting plate 12. As such, when the end plate body 11 or the rigid connecting plate 12 is subject to an external force, or when the side plate 2 exerts a tensile force on the rigid connecting plate 12, the end plate body 11 and the rigid connecting plate 12 will not be easily shift from each other and disengage from the connection.

Optionally, the second extending segment 122b comprises a protrusion 124 in a surface for contacting with the end plate body 11. When the rigid connecting plate 12 and the end plate body 11 are connected together through injection molding or mold casting to form the composite end plate 1, a portion of the end plate body 11, which corresponds to the protrusion 124 in the second extending segment 122b, can form a concave region, such that the protrusion 124 in the second extending segment 122b will enter into the concave region in the end plate body 11 and thereby the end plate body 11 and the second extending segment 122b can mesh with each other.

Optionally, the second extending segment 122b comprises both the recess 123 and the protrusion 124 in its surface for contacting with the end plate body 11. When the rigid connecting plate 12 and the end plate body 11 are connected together through injection molding or mold casting to form the composite end plate 1, the end plate body 11 and the second extending segment 122b can similarly mesh with each other.

Optionally, there are multiple protrusions and multiple recesses 123, and the number of the protrusions is same with that of the recesses. When the protrusions connect to the recesses 123 in one-to-one correspondence, it is possible to further improve the connection strength of the end plate body 11 and the rigid connecting plate 12.

According to the embodiment, the end plate body 11 can be detachably connected to the rigid connecting plate 12. The end plate body 11 comprises an inserting groove 114. The inserting groove 114 extends in the height direction Z of the end plate body 11, and passes through the top portion and the bottom portion of the end plate body 11. The connecting arm 122 can be inserted into the inserting groove 114 along the height direction Z. The inserting groove 114 comprises an opening in the second surface 11b. The inserting groove 114 can provide accurate positioning of the rigid connecting plate 12, which facilitates the fixed connection of the rigid connecting plate 12 and the end plate body 11.

Optionally, the connecting arm 122 can form an interference fit with the inserting groove 114 such that the rigid connecting plate 12 is connected to the end plate body 11. Alternatively, the connecting arm 122 is attached to a surface of the end plate body 11 in which the inserting groove 114 is formed through an adhesive such that the rigid connecting plate 12 is connected to the end plate body 11.

Optionally, the second extending segment 122b comprises a recess 123 in its surface for contacting with the end plate body 11, and the end plate body 11 comprises a protrusion for matching with the recess 123 at a surface in which the inserting groove 114 is formed. When the connecting arm 122 is inserted into the inserting groove 114 at a predetermined depth, the protrusion enters into the recess 123 in the second extending segment 122b such that the end plate body 11 and the rigid connecting plate 12 are fixedly connected to each other. Optionally, there are multiple protrusions and multiple recesses 123, and the number of the protrusions is same with that of the recesses. When the protrusions connect to the recesses 123 in one-to-one correspondence, it is possible to further improve the connection strength of the end plate body 11 and the rigid connecting plate 12.

It should be appreciated that the second extending segment 122b comprises the protrusion 124 in its surface for contacting with the end plate body 11, and the end plate body 11 comprises the recess for matching with the protrusion 124 at a surface in which the inserting groove 114 is formed. It can similarly achieve the same function.

The end plate body 11 according to embodiments of the disclosure further comprises a receiving groove 115 at the intermediate transitional segment 112, which has a shape matching with that of the transferring segment 121. The receiving groove 115 is recessed from the second surface 11b toward the first surface 11a, and is in communication with the inserting groove 114. The receiving groove 115 extends in the height direction Z of the end plate body 11, and passes through the top portion and the bottom portion of the end plate body 11. The transferring segment 121 falls into the receiving groove 115 such that a surface of the transferring segment 121 away from the end plate body 11 is flush with the second surface 11b. As such, it is avoided that the transferring segment 121 lifts the side plate 2 and thus a lifted end of the side plate 2 adversely influences the welding process. Therefore, it is beneficial to weld the end of the side plate 2 to the transferring segment 121. Furthermore, when an end of the side plate 2 is fixedly connected to the transferring segment 121 of the rigid connecting plate 12, the side plate 2 can contact with both the second surface 11b and the surface of the transferring segment 121 away from the end plate body 11. It is avoided that the transferring segment 121 lifts the side plate 2 such that there is a gap between the side plate 2 and the second surface 11b. Therefore, it is possible to increase areas of the side plate 2 and the end plate body 11 on which forces act, and provide more uniform stress state in the composite end plate 1.

In an embodiment, the rigid connecting plate 12 comprises a transferring segment 121 and two connecting arms 122. The transferring segment 121 comprises two ends opposite to each other in the width direction X of the end plate body 11. At each of the two ends of the transferring segment 121, there is arranged a connecting arm 122. The two connecting arms 122 of the rigid connecting plate 12 are spaced from each other. When a battery is expanded and deformed such that the rigid connecting plate 12 is subject to tensile forces from the side plates 2, the two connecting arms 122 can resist the tensile forces simultaneously to provide more uniform stress state in the rigid connecting plate 12. Furthermore, the two connecting arms 122 are symmetrically disposed with respect to a central axis of the end plate body 11. The central axis extends in the height direction Z of the end plate body 11. Connecting portions of the two side plates 2 at the respective ends, which can be connected to the transferring segment 121, are also symmetrically disposed with respect to the central axis of the end plate body 11. As such, when the two side plates 2 exert tensile forces on the rigid connecting plate 12 simultaneously, the rigid connecting plate 12 is in uniform stress state in the width direction X of the end plate body 11 and thus is in equilibrium state. The overall positional stability of the composite end plate 1 can be further improved.

Optionally, the second extending segment 122b and the transferring segment 121 of the rigid connecting plate 12 according to the embodiment extend in opposite directions. In other words, with respect to the first extending segment 122a, the second extending segment 122b and the transferring segment 121 are disposed at two respective sides of the first extending segment 122a. As such, the rigid connecting plate 12 according to the embodiment can be simply manufactured, and can be formed in a one-step forming process with punching, die pressing or die casting. Moreover, when the rigid connecting plate 12 and the end plate body 11 are formed and composited through an extrusion process, a portion of the end plate body 11 will be deformed under extrusion and thus connected to the second extending segment 122b in the thickness direction Y of the end plate body 11 through crimping. Preferably, the second extending segment 122b and the transferring segment 121 of the rigid connecting plate 12 are parallel to each other.

In an embodiment, as shown in FIG. 6, the rigid connecting plate 12 comprises a transferring segment 121 and a connecting arm 122. The connecting arm 122 is disposed at a center of the transferring segment 121. Optionally, the connecting arm 122 according to the embodiment is in a plate shape and perpendicular to the transferring segment 121 such that the rigid connecting plate 12 as a whole has a T-shaped structure. Optionally, the connecting arm 122 according to the embodiment comprises a first extending segment 122a and a second extending segment 122b perpendicular to each other. The connecting arm 122 is connected to the transferring segment 121 through the first extending segment 122a and the second extending segment 122b is disposed parallel to the transferring segment 121, such that the connecting arm 122 has a L-shaped or T-shaped structure. Optionally, the second extending segment 122b can also comprise recesses 123 and/or protrusions 124.

According to embodiments of the disclosure, the composite end plate 1 comprises the end plate body 11 and the rigid connecting plate 12 made of different materials. The side plate 2 can be indirectly connected to the composite end plate 1 through the rigid connecting plate 12, thus it is beneficial to select different materials of the side plate 2 and the rigid connecting plate 12 according to actual requirements in application. The material of the end plate body 11 can also be flexibly selected. Thus, it is possible to achieve an overall lightweight design of the composite end plate 1 and thereby an overall lightweight design of the battery module. When the composite end plate 1 is applied in the battery module, the rigid connecting plate 12 can be fixedly connected to the side plate 2. The rigid connecting plate 12 and the side plate 2 can be made of identical material, and can be connected to each other through a welding process. As such, welding seam formed between the rigid connecting plate 12 and the side plate 2 has high seam strength and good resistance to tension such that the composite end plate 1 can bear larger expansion forces resulted from the battery expansion and it is possible to improve overall structural reliability of the battery module.

According to embodiments of the disclosure, there is further provided a battery module, comprising a plurality of batteries and a fixing frame. The batteries are arranged side by side in a direction. The fixing frame encloses and fixes all the batteries at a periphery of the batteries. The fixing frame comprises two side plates 2 and two composite end plates 1 according to embodiments of the disclosure. The batteries form an assembly. The two composite end plates 1 are disposed at two opposite sides of the assembly in the battery arrangement direction. In other words, all the batteries in the assembly are sandwiched between the two composite end plates 1. The composite end plates 1 and the side plates 2 are successively and alternatively disposed to surround all the batteries. The two side plates 2 are disposed at two opposite sides of the assembly in a direction perpendicular to the battery arrangement direction. The composite end plates 1 and the side plates 2 are successively and alternatively disposed to surround all the batteries. The side plate 2 and the rigid connecting plate 12 are made of an identical material. The rigid connecting plates 12 in the two composite end plates 1 disposed at the two respective sides of the batteries are connected via the two side plates 2. Optionally, each side plate 2 has a U-shaped structure. Two free ends of the side plate 2 are bent to the side of the second surface 11b of the end plate body 11 and are fixedly connected to the connecting portions of the rigid connecting plates 12.

In an embodiment, the side plate 2 and the rigid connecting plate 12 are made of steel. Preferably, the side plate 2 and the rigid connecting plate 12 are made of stainless steel. As such, the rigid connecting plate 12 and the side plate 2 can be fixedly connected through a welding process. Welding seam between them formed in the welding process has high seam strength and can bear larger expansion forces resulted from the battery expansion. It is possible to effectively reduce the movement or deformation of the composite end plate 1 in a direction away from the batteries and improve overall structural reliability of the battery module.

Although the present disclosure has been described with reference to the preferred embodiments, various modifications may be made to the present disclosure and components may be replaced with equivalents without departing from the scope of the present disclosure. In particular, the technical features mentioned in the various embodiments can be combined in any manner as long as there is no structural conflict. The present disclosure is not limited to the specific embodiments disclosed herein, but includes all technical solutions falling within the scope of the claims.

What is claimed is:

1. A composite end plate for a battery module, comprising:
   an end plate body comprising a first surface and a second surface disposed opposite to each other in its thickness direction, wherein the end plate body comprises a first connecting segment, an intermediate transitional segment and a second connecting segment disposed successively, side-by-side, in its width direction; and
   wherein the composite end plate comprises one single rigid connecting plate, the rigid connecting plate comprising:
      a transferring segment,
      two connecting arms, each connected at an opposite side in the width direction of the transferring segment;
   wherein the rigid connecting plate and the end plate body are made of different materials, the rigid connecting plate is disposed at the intermediate transitional segment of the end plate body, and wherein each connecting arm extends from the transferring segment toward the end plate body, such that the connecting arms are embedded into the intermediate transitional segment whereby the rigid connecting plate and the end plate body are fixedly connected; the transferring segment is located at the second surface and extends in a height direction of the end plate body, and a surface of the transferring segment away from the intermediate transitional segment is exposed to external environment and can be fixedly connected to an external structural component.

2. The composite end plate according to claim 1, wherein the end plate body and the rigid connecting plate are made of metal materials.

3. The composite end plate according to claim 2, wherein the connecting arm comprises a first extending segment and a second extending segment intersecting with each other, wherein the connecting arm is connected to the transferring segment through the first extending segment, and the first extending segment intersects with the transferring segment.

4. The composite end plate according to claim 3, wherein the first extending segment is perpendicular to the transferring segment, the first extending segment is perpendicular to the second extending segment, and the second extending segment and the transferring segment are disposed parallel to each other.

5. The composite end plate according to claim 1, wherein the connecting arm comprises a first extending segment and a second extending segment intersecting with each other, wherein the connecting arm is connected to the transferring segment through the first extending segment, and the first extending segment intersects with the transferring segment.

6. The composite end plate according to claim 5, wherein the second extending segment comprises a recess and/or a protrusion at a surface for contacting with the end plate body.

7. The composite end plate according to claim 5, wherein the first extending segment is perpendicular to the transferring segment, the first extending segment is perpendicular to the second extending segment, and the second extending segment and the transferring segment are disposed parallel to each other.

8. The composite end plate according to claim 5, wherein the end plate body comprises an inserting groove extending in the height direction, and the rigid connecting plate can be inserted into the inserting groove through the connecting arm and connected to the end plate body.

9. The composite end plate according to claim 1, wherein the end plate body comprises an inserting groove extending in the height direction, and the rigid connecting plate can be inserted into the inserting groove through the connecting arm and connected to the end plate body.

10. The composite end plate according to claim 1, wherein a surface of the transferring segment away from the end plate body is flush with the second surface.

11. The composite end plate according to claim 1, wherein the end plate body comprises a plurality of through holes, which are disposed in the intermediate transitional segment and extend in the height direction.

12. The composite end plate according to claim 1, wherein the end plate body is made of non-metal material, and the rigid connecting plate is made of metal material.

13. The composite end plate according to claim 1, wherein the two connecting arms are disposed symmetrically with respect to a central axis of the end plate body, and the central axis extends in the height direction of the end plate body.

14. A battery module comprising:
    a plurality of batteries arranged side by side; and a fixing frame enclosing all the batteries at a periphery of the batteries, wherein the fixing frame comprises two composite end plates and two side plates, each composite end plate comprises:
    an end plate body comprising a first surface and a second surface disposed opposite to each other in its thickness direction, wherein the end plate body comprises a first connecting segment, an intermediate transitional segment and a second connecting segment disposed successively side-by-side, in its width direction; and
    wherein the composite end plate comprises one single rigid connecting plate, the rigid connecting plate comprising:
       a transferring segment,
       two connecting arms, each connected at an opposite side in the width direction of the transferring segment;
    wherein the rigid connecting plate and the end plate body are made of different materials, the rigid connecting plate is disposed at the intermediate transitional segment of the end plate body, and wherein each connecting arm extends from the transferring segment toward the end plate body, such that the connecting arms are embedded into the intermediate transitional segment whereby the rigid connecting plate and the end plate body are fixedly connected, the transferring segment is located at the second surface and extends in a height direction of the end plate body, and a surface of the transferring segment away from the intermediate transitional segment is exposed to external environment and can be fixedly connected to the side plates, wherein the composite end plates and the side plates are successively and alternatively disposed to surround the batteries, the side plate and the rigid connecting plate are made of an identical material and the side plate is fixedly connected to the transferring segment.

15. The battery module according to claim 14, wherein the end plate body and the rigid connecting plate are made of metal materials.

16. The battery module according to claim 14, wherein the end plate body is made of non-metal material, and the rigid connecting plate is made of metal material.

17. The battery module according to claim 14, wherein the connecting arm comprises a first extending segment and a second extending segment intersecting with each other, wherein the connecting arm is connected to the transferring segment through the first extending segment, and the first extending segment intersects with the transferring segment.

18. The battery module according to claim 14, wherein the end plate body comprises an inserting groove extending in the height direction, and the rigid connecting plate can be inserted into the inserting groove through the connecting arm and connected to the end plate body.

19. The battery module according to claim 14, wherein the two connecting arms are disposed symmetrically with respect to a central axis of the end plate body, and the central axis extends in the height direction of the end plate body.

* * * * *